US007937389B2

(12) United States Patent
Jiao et al.

(10) Patent No.: US 7,937,389 B2
(45) Date of Patent: May 3, 2011

(54) DYNAMIC REDUCTION OF DIMENSIONS OF A DOCUMENT VECTOR IN A DOCUMENT SEARCH AND RETRIEVAL SYSTEM

(75) Inventors: Yu Jiao, Knoxville, TN (US); Thomas E. Potok, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 537 days.

(21) Appl. No.: 12/072,723

(22) Filed: Feb. 28, 2008

(65) Prior Publication Data

US 2009/0119343 A1    May 7, 2009

Related U.S. Application Data

(60) Provisional application No. 61/001,437, filed on Nov. 1, 2007.

(51) Int. Cl.
*G06F 17/30* (2006.01)
(52) U.S. Cl. ............... 707/736; 707/737; 707/705
(58) Field of Classification Search .......... None
See application file for complete search history.

(56) References Cited

U.S. PATENT DOCUMENTS

| | | | |
|---|---|---|---|
| 6,613,101 B2 | 9/2003 | Mander et al. | |
| 6,985,825 B1 * | 1/2006 | Good et al. ............... | 702/83 |
| 7,003,519 B1 | 2/2006 | Biettron et al. | |
| 7,072,883 B2 | 7/2006 | Potok et al. | |
| 7,315,858 B2 | 1/2008 | Potok et al. | |
| 2002/0022956 A1 | 2/2002 | Ukrainczyk et al. | |
| 2003/0069873 A1 | 4/2003 | Fox et al. | |
| 2005/0004910 A1 * | 1/2005 | Trepess ..................... | 707/5 |
| 2006/0080311 A1 | 4/2006 | Potok et al. | |

* cited by examiner

*Primary Examiner* — Hosain T Alam
*Assistant Examiner* — Johnese Johnson
(74) *Attorney, Agent, or Firm* — Boyle Fredrickson, S.C.

(57) ABSTRACT

The method and system of the invention involves processing each new document (20) coming into the system into a document vector (16), and creating a document vector with reduced dimensionality (17) for comparison with the data model (15) without recomputing the data model (15). These operations are carried out by a first computer (11) while a second computer (12) updates the data model (18), which can be comprised of an initial large group of documents (19) and is premised on the computing an initial data model (13, 14, 15) to provide a reference point for determining document vectors from documents processed from the data stream (20).

16 Claims, 8 Drawing Sheets

| STEMMED WORD | GLOBAL FREQUENCY |
|---|---|
| m ROWS | |

GLOBAL FREQUENCY TABLE (35)

Fig. 4

| DOCUMENT ID | STEMMED WORD | TERM FREQUENCY |
|---|---|---|
| | | |

TERM FREQUENCY TABLE (36)

Fig. 5

DYNAMIC REDUCTION OF DIMENSIONS OF A DOCUMENT VECTOR IN A DOCUMENT SEARCH AND RETRIEVAL SYSTEM

CROSS-REFERENCE TO RELATED APPLICATIONS

The benefit of priority based on U.S. Prov. App. No. 61/001,437 filed Nov. 1, 2007, is claimed herein.

STATEMENT REGARDING FEDERALLY SPONSORED RESEARCH

This invention was made with U.S. Government support under Contract No. DE-AC05-00OR22725 awarded to UT-Battelle LLC, by the U.S. Dept. of Energy. The Government has certain rights in the invention.

TECHNICAL FIELD

The field of the invention is computer systems and methods for search and retrieval of electronic units of information commonly referred to as documents.

BACKGROUND ART

Some of the main functions of computer technology are to help people efficiently store large amounts of information, accurately cluster the information, and quickly locate some piece of key information that they need. Searching and retrieval may be carried out online through networks or offline on bulk storage systems.

Prior information search and retrieval methods have used clustering techniques and a Vector Space Model (VSM), where each unique word within a collection of documents represents a dimension in space, and where each document represents a vector within that multidimensional space. Vectors that are close together in this multidimensional space form clusters, or groups of documents that are similar. The quality of information retrieval and data clustering is usually judged by two metrics: precision and recall. Precision refers to the percentage of documents retrieved that are relevant to the query, and recall reflects the percentage of all relevant documents that have been retrieved.

Examples of such systems are disclosed in Potok et al., U.S. Pat. No. 7,072,883 and Potok et al. US2003/0120639.

Attempts to improve the precision and recall of information retrieval and data categorization are often hindered by two characteristics of textual data: the synonymy (multiple words with the same meaning) and polysemy (a single word with multiple meanings) that exist in languages, and the high dimensionality of the data (each unique word in a document is a dimension). Latent Semantic Indexing (LSI) is known as one of the most effective solutions to these problems. The underlying technology of LSI is the truncated singular value decomposition (SVD). Besides the fact that this technique can alleviate the negative impact of synonymy and polysemy, it also reduces the number of dimensions of a VSM, and therefore reduces the amount of space required to store information.

A technical problem is that computing SVD is computationally expensive, meaning that it takes a long time to compute the results. Therefore, it cannot be used to process high volume data streams, where new data comes into the system at high frequency. Most recent work in this area has mainly focused on inventing incremental SVD updating schemes. However, it is mathematically provable that SVD updating schemes can never reach linear computational complexity.

SUMMARY OF THE INVENTION

The invention provides a method and computer system for reducing storage and increasing processing speed during search operations by reducing dimensions of a document vector before performing a similarity analysis to a plurality of other documents.

The method of the invention comprises: receiving a document that is input to the computer for determining the similarity of the document to the plurality of other documents; preprocessing the document to generate a document vector; reducing a number of dimensions in the document vector; comparing the document vector to at least one document vector for the plurality of documents to determine a similarity of the document to the plurality of other documents; and displaying a measure of similarity of the document to the other documents to a human observer.

In further aspects of the invention, a data model representing the plurality of initial documents is computed from a large number of documents such as 200,000. The document vector for a recently received document is compared to at least one document vector for the data model to determine the similarity of the document to the documents forming the data model. This is accomplished without updating the data model until at least 20,000 new documents have been received, as updating the data model can be a time-consuming operation. Therefore, it is a further aspect of the invention that document similarity analysis is performed in the foreground on a first computer and the updating of the data model is performed in the background on a second computer that communicates with the first computer.

The invention represents a significant breakthrough in dynamic dimensionality reduction for data streams. Current dimensionality reduction methods (e.g., the SVD updating schemes) cannot achieve linear computational complexity and therefore, they do not scale well as the problem size increases. In addition, these approaches require the system to maintain a centralized data structure that grows in size as data flows into the system, which limits the parallelization of the scheme, causes system performance degradation in time, and may eventually crash the system. The dimensionality reduction scheme presented here maintains only a small, fixed amount of information in the system and can reduce the dimensionality of data in linear time. Since no real-time updates need to be done to the system, this scheme can be easily implemented in parallel.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIGS. 4 and 5 are detail diagrams of tables referred to in FIG. 3;

DETAILED DESCRIPTION

Figure 1:
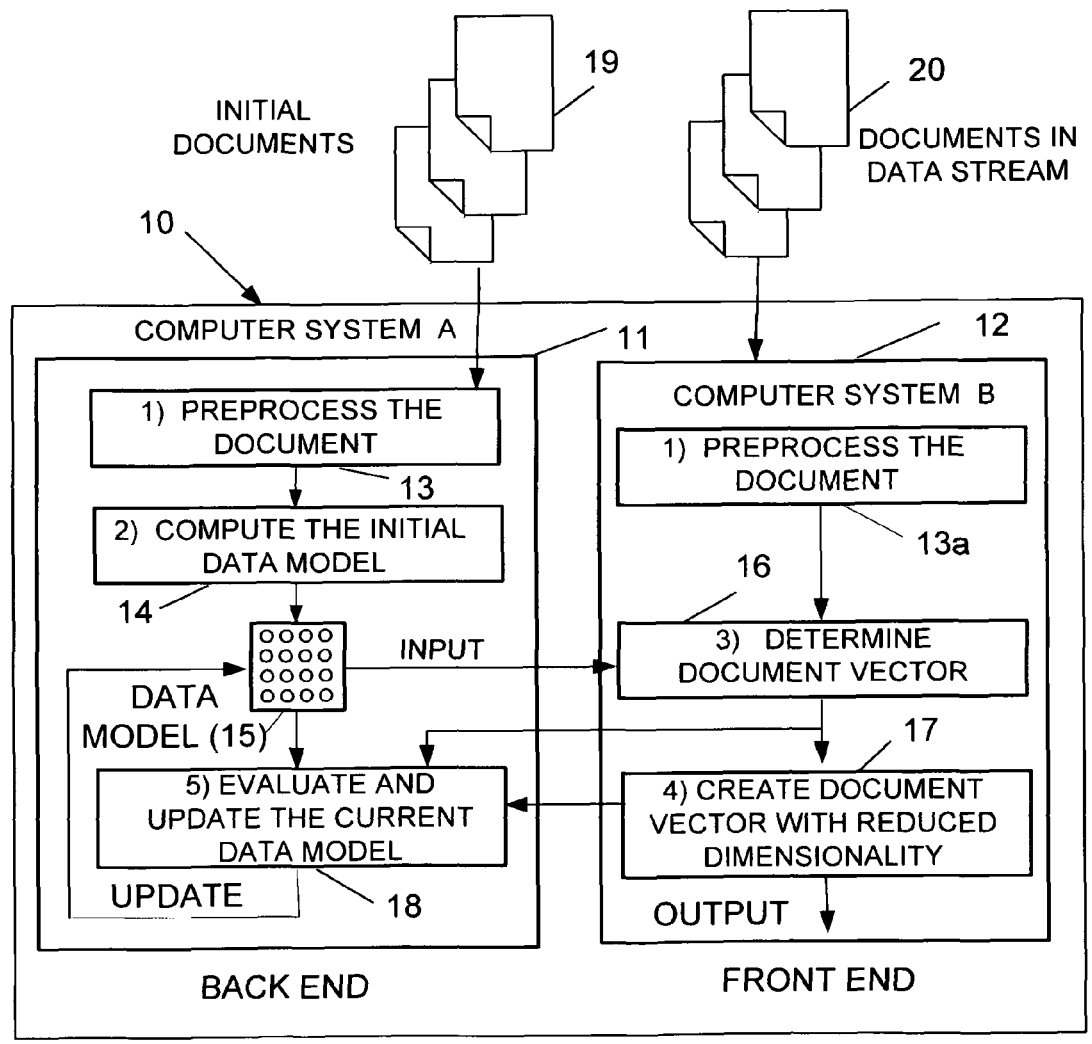
FIG. 1 is a block diagram of the system for practicing the method of the present invention.

Referring to FIG. 1 of the drawings, the method and system of the invention involves processing each new document coming into the system into a document vector (block 16); and 4) and creating a document vector with reduced dimensionality (block 17) without recomputing an initial data model 15. Preferably, these operations are carried out by a computer system that has been freed from background tasks as described below.

These tasks include some preprocessing of the an initial large group of documents 19 numbering 500,000 in this example (block 13) and is premised on the computing an initial data model (blocks 14, 15) which provides a reference point for determining document vectors from documents processed from the data stream.

Periodically, the data model is preferably updated as represented by process block 18. As this is a time consuming operation, it is preferably performed in the background.

This system of the invention 10 involves two separate computer systems. A back-end Computer System A (11) preprocesses the documents 20 and computes, evaluates, and optionally updates the data model as described above as activities 1), 2) and optionally 5). A front-end Computer System B (12) receives the documents 20 in a data stream and preprocesses the documents 20 as represented by process block 13a and with the data model 15 as an input, generates document vectors with reduced dimensionality as an output as described above for activities 3) and 4). Computer System A and Computer System B execute these functions as a result of a computer program of instructions. In the following description the process blocks represent execution of groups of these program instructions.

Figure 2:
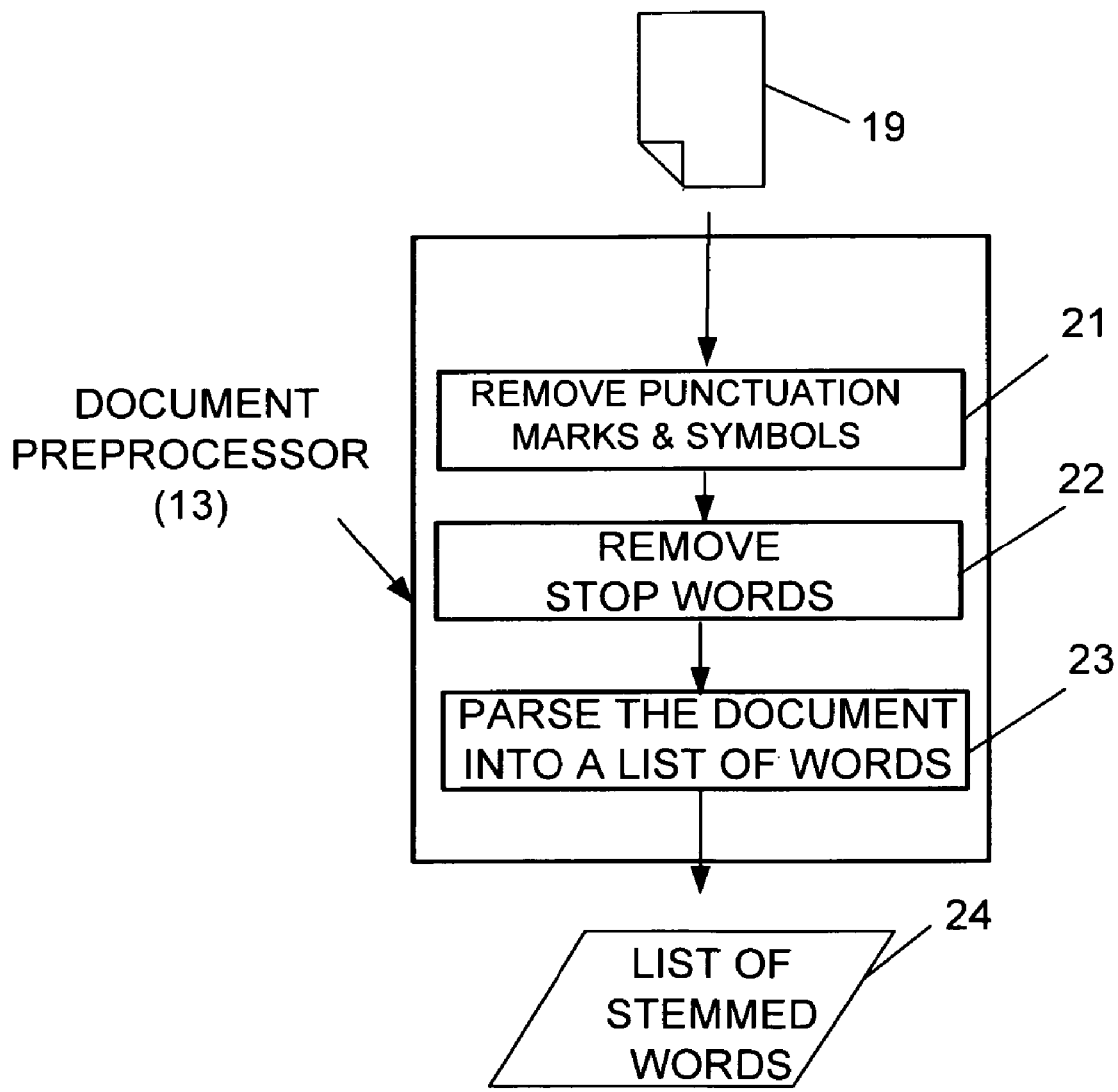
FIG. 2 is a detail block diagram of one of the blocks of the system of FIG. 1.

Referring to FIG. 2 of the drawings, the preprocessing activity 13 more particularly involves the input of a text document 19 and an output in form of a list of stemmed words 24. Although this preprocessing activity is illustrated in FIG. 2 and described for the initial large group of documents 19 forming the data model 15, the process is also the same for preprocessing documents 20 from the data stream as illustrated in FIG. 1.

In a first activity, all punctuation marks and unrecognizable symbols are removed as represented by process block 21 in FIG. 2. Examples of these punctuation marks and unrecognizable symbols are contained in Appendix A.

In the next activity, stop words and common words are removed as represented by process block 22 in FIG. 2. Stop words are common words that occur frequently in any type of documents. Some examples include "a," "the," etc. A list of common words removed from all documents is shown in Appendix B.

After removing stop words, each document is parsed into a list of words using white space as the delimiter as represented by process block 23 in FIG. 2. Each word is then stemmed, i.e., has its suffix stripped off. There are several algorithms available for stemming. Two common algorithms for doing this are disclosed in Lovins, J. B. "Development of a stemming algorithm," *Mechanical Translation and Computational Linguistics*, pp. 11, 22-31 (1968) and the Porter, M. F. "An algorithm for suffix stripping," *Program,* 14(3), pp. 130-137 (1980). As a result, the input document is transformed into a listed of stemmed words that represent it. It should be noted that this list may contain multiple instances of the same stem.

Figure 3:
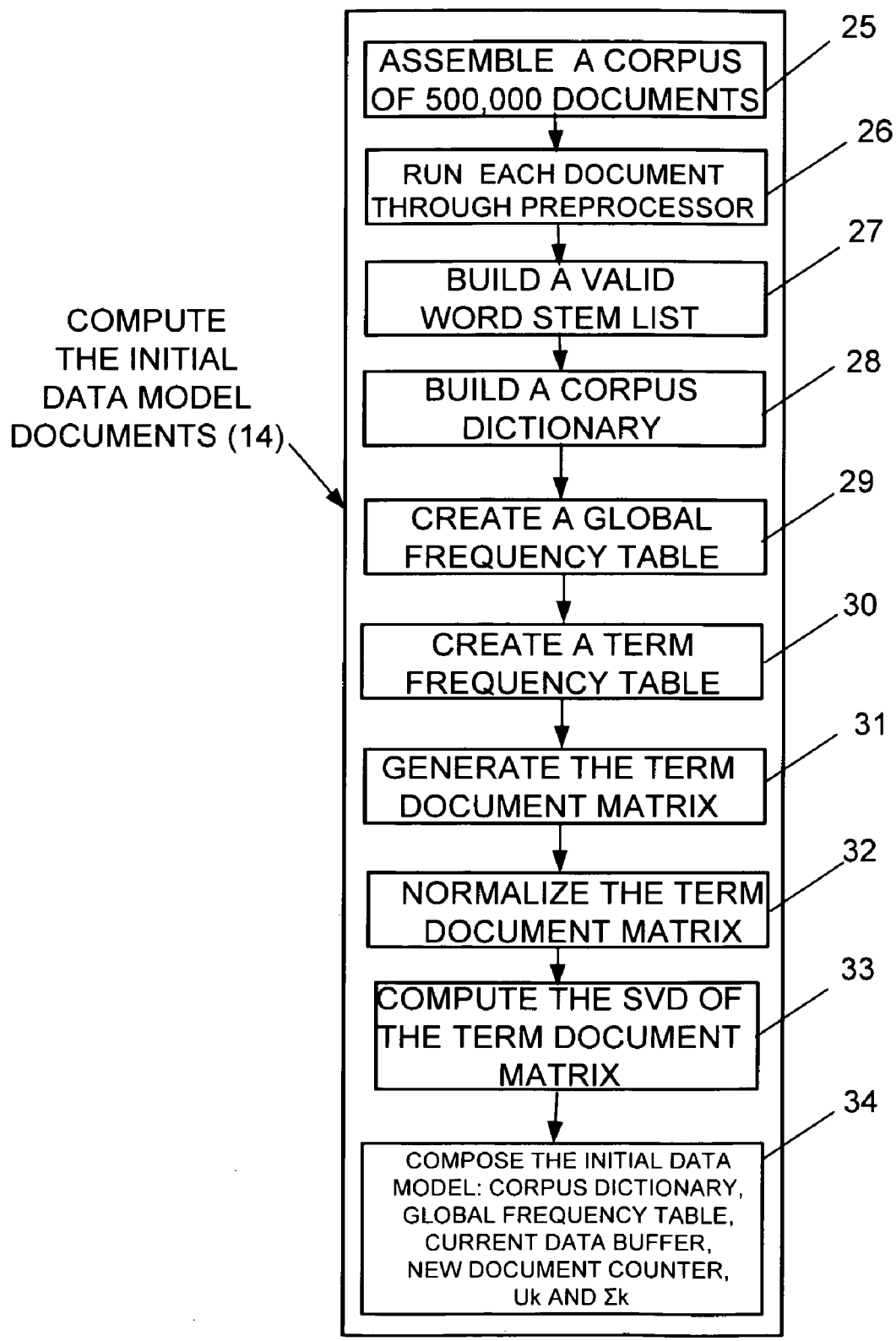
FIG. 3 is a detail block diagram of another one of the blocks of the system of FIG. 1.

The computation of the initial data model 15 for document dimensionality reduction, which is represented by process block 14 in FIG. 1 is more particularly shown as a 10-step process in FIG. 3. This data model is computed without the knowledge of the data stream to be processed.

As represented by process block 25 in FIG. 3, a large corpus of documents of similar size is assembled. A minimum size of the corpus is suggested to be 200,000 documents. In a test embodiment, the corpus was formed by 500,000 documents. Each document is assigned a unique ID number from 0 to 499,999. If the data stream of interest is not domain-specific, news articles from the public domain are a good source. If the data stream of interest is domain-specific, e.g. computer science, medical reports, etc., existing documents from this particular domain should be used in order to achieve better performance.

As represented by process block 26 in FIG. 3, each of the 500,000 documents in the corpus is run through the Document Preprocessor 13 shown in FIGS. 1 and 2. This results in 500,000 lists of stemmed words. Each list represents an original document.

As represented by process block 27 in FIG. 3, The words are stemmed using a standard English dictionary, such as the one used for the free spell checking software Ispell, (http://www.gnu.org/software/ispell/ispell.html). This list of stemmed words is referred to as the "Valid Word Stem List."

As represented by process block 28 in FIG. 3, a word list is constructed of all the unique, stemmed words in the 500,000 documents. Any stemmed words that are not in the Valid Word Stem List are deleted. The remaining word stems are sorted in alphabetical order. This sorted list is referred to as the Corpus Dictionary. In this dictionary, words are sequentially numbered from 0 to m−1, where m is the total number of words in the Corpus Dictionary. Each unique stemmed word is called a dimension. In the following description, the words "term" and "stemmed word" are use interchangeably.

As represented by process block 29 in FIG. 3, a Global Frequency Table (GFT) is created. This table contains two columns: "Stemmed Word" and "Global Frequency" as illustrated in FIG. 4. The GFT has m rows, and each row of the Stemmed Word column corresponds to a stemmed word in the Corpus Dictionary. Global frequency is defined as, in the 500,000 document corpus, the number of documents containing that stemmed word.

As represented by process block 30 in FIG. 3, a Term Frequency Table (TFT) is then generated. This table contains three columns: Document ID, Stemmed Word, and Term Frequency as seen in FIG. 5. Document ID refers to the unique ID assigned to each of the 500,000 documents in process block 25. The Stemmed Word column stores lists of stemmed words resulting from execution of the preprocessor 13 in FIG. 2 and representing all documents. Term frequency is defined as the number of times that a particular word/term appears in a particular document. Therefore, the number of rows in the TFT equals to the sum of all stemmed words in all 500,000 documents. Note that the TFT is only used to create the initial data model 15. It is no longer stored or used once the initial data model is computed.

Figure 6:
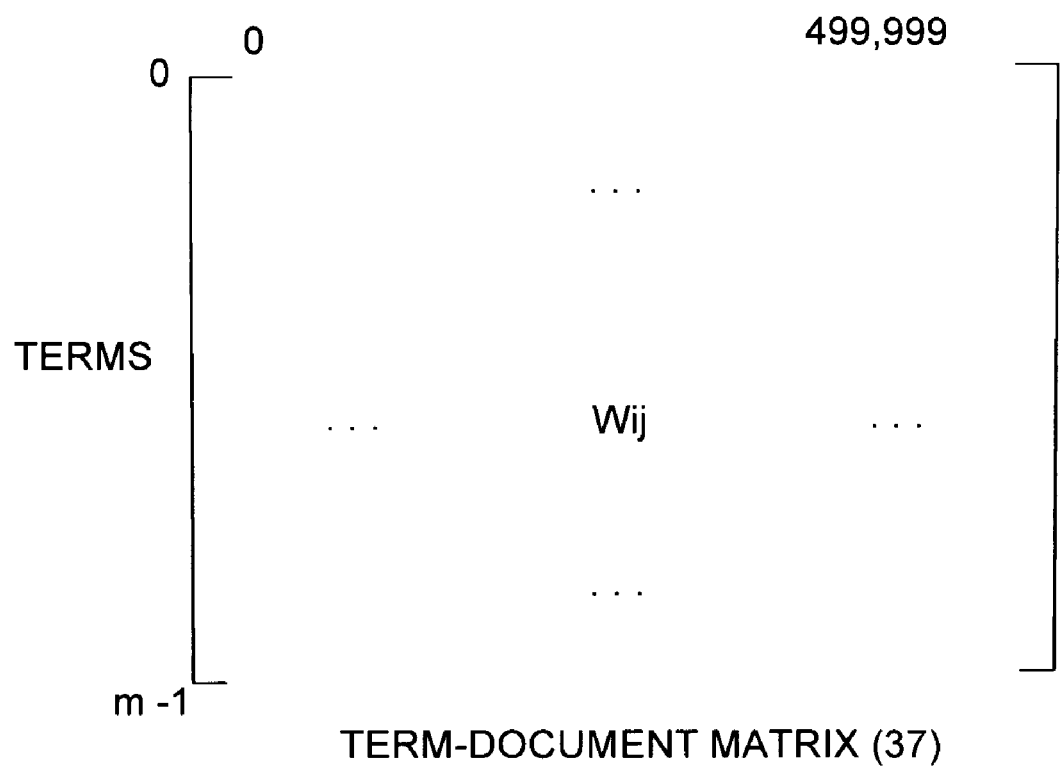
FIG. 6 is a diagram of matrix referred to in FIG. 3.

As represented by process block 31 in FIG. 3, the term-document matrix shown in more detail in FIG. 6, and denoted as M, is then generated. This is an m×500,000 matrix. Each row represents a stemmed word in the Corpus Dictionary; and therefore, there are m rows. The 500,000 documents are sorted in ascending order of the document ID. Each column represents a document ID, from 0 to 499,999.

The term-document matrix is computed using an algorithm according to the following expression. The value of each element of the term-document matrix, M, is the weight of stemmed word i in document j, and it is denoted as $W_{ij}$. $W_{ij}$ is calculated as follows:

$$Wij = TFij \times \log_2(500000/GFi) \qquad \text{Eq. 1}$$

where:
- i: is a row in M; $0 \leq i \leq m-1$;
- j: is a column in M; $0 \leq j \leq 499,999$;
- $TF_{ij}$: is the term frequency of stemmed word i in document j; if term i does not exist in document j, then $TF_{ij}=0$;
- $GF_i$: is the global frequency of stemmed word i; and
- $W_{ij}$: is the weight of stemmed word i in document j.

As represented by process block 32 in FIG. 3, the term-document matrix, M, is then normalized. Each column of M is referred to as a Document Vector, denoted as d. It is an m-dimensional vector. The element of each d is normalized by dividing its value by the magnitude of that document vector ($\|d\|$), where $$\|d\| = \sqrt{\sum_{i=0}^{m} W_{ij}^2}.$$

Therefore, the final term-document matrix consists of 500,000 normalized document vectors. This normalization of documents vectors is previously known from Salton, G. and Buckley, C. "Term weighting approaches in automatic text retrieval" *Information Processing and Management*, 24(5), 513-523 (1998).

As represented by process block 33 in FIG. 3, a truncated Singular Value Decomposition (SVD) is computed with a predefined k value, where k is the desired dimension of the document vectors created as output of this system as disclosed in Berry, M. W., Dumais, S. T., and O'Brien, C. W., "Using linear algebra for intelligent information retrieval", *SIAM Review*, 37(4), 573-595. Typically, k<<m. In a test embodiment, k was set to 200 to reduce the dimensionality of a term-document matrix seen in FIG. 6 to a matrix having 200 dimensions instead of a matrix having m single dimensions. The SVD process can be performed either by commercial software such as Matlab (http://www.mathworks.com/) or by a publicly available linear algorithm package such as "svdpackc". (http://www.netlib.org/svdpack).

The truncated SVD transforms M into the product of three matrices, which are commonly denoted as $U_k$, $\Sigma_k$, and $V_k$ in Berry and O'Brien, cited above. Specifically, $U_k$ is a m×k matrix; $\Sigma_k$ is a k×k matrix; and $V_k$ is a k×50,000 matrix.

$$SVD_k(M) = U_k \Sigma_k V_k^T \qquad \text{Eq. 2}$$

Figure 7:
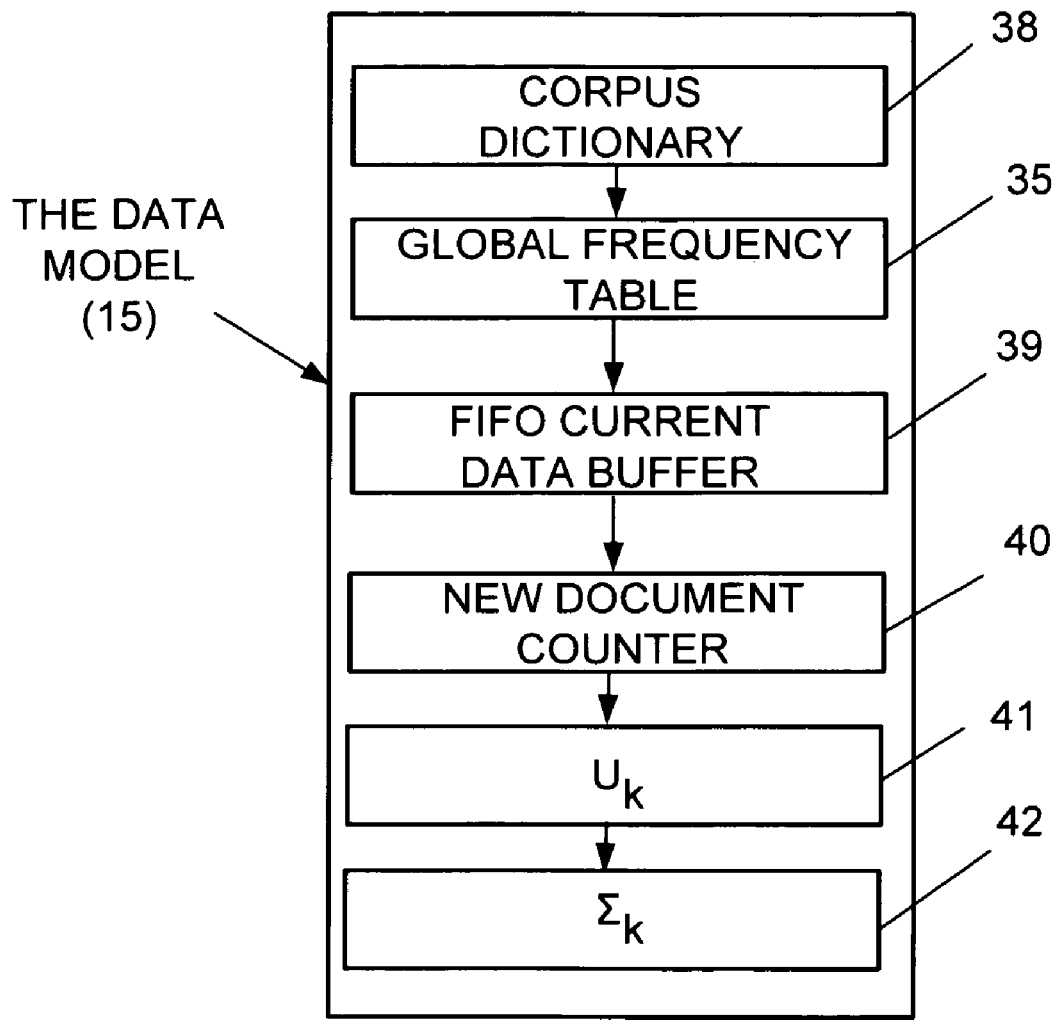
FIG. 7 is detail block diagram of another one of the blocks illustrated in FIG. 3.

As seen in more detail in FIG. 7, the data model 15 consists of six components: the Corpus Dictionary 38, the Global Frequency Table 35, a fixed size first-in-first-out (FIFO) data buffer 39 with capacity of 20,000 m×1 document vectors, a New Document Counter 40, and the two matrices $U_k$ and $\Sigma_k$ 41 and 42. The FIFO data buffer 39 is referred to as the "Current Data Buffer". The New Document Counter is initially set to 0.

Among the six components, the Corpus Dictionary 38 and the Global Frequency Table 35 are never updated. The FIFO Current Data Buffer 39 and the New Document Counter 40 are updated upon the arrival of each new document. The matrices $U_k$ and $\Sigma_k$, 41 and 42, are updated when the current data model is updated as described below and represented generally by block 18 in FIG. 1.

Figure 8:
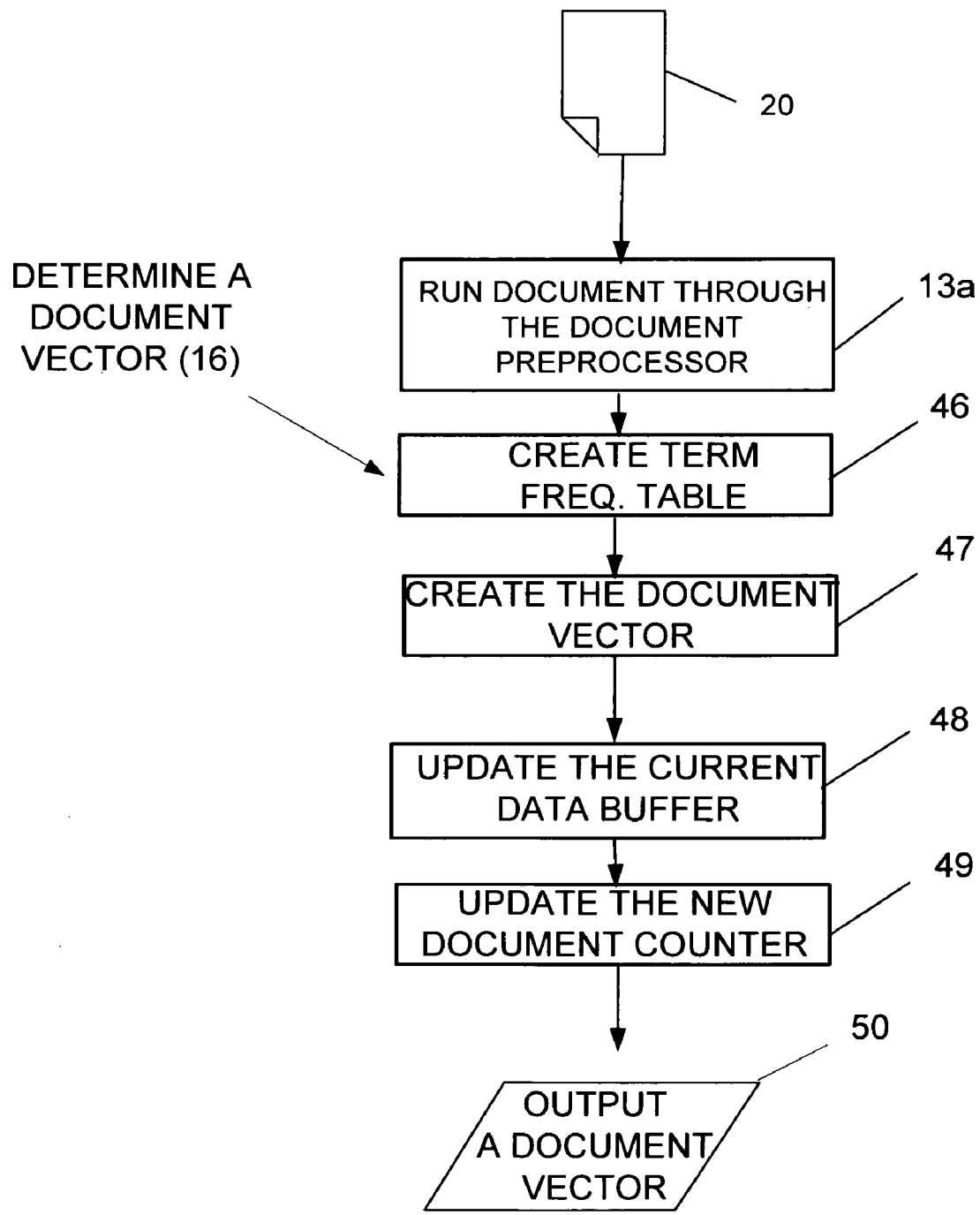
FIG. 8 is detail block diagram of another one of the blocks illustrated in FIG. 3.

A new document 20 entering the system from the data stream is first preprocessed as represented by process block 13a in FIG. 1. The document is processed into an m×1 document vector that represents the document. This process is illustrated in FIG. 8. As represented by process block 13a, in the first step the document 20 is run the document preprocessor 13a as described in relation to FIG. 2 to produce a list of stemmed words 24. The unique stemmed words and the number of occurrences of each unique stemmed word in this list. This information is then recorded in a Term Frequency Table as diagrammed in FIG. 5 and this process is represented by block 46. Here, values in the "Document ID" column are not specified in the Table and this column is left blank.

Next, as represented by process block 47, a m×1 document vector, d, is created. Each of the m stemmed word in the Corpus Dictionary corresponds to the m rows of this document vector d. The value of each element of d is calculated using Equation 1. The document vector is then normalized by dividing its value by the magnitude of that document vector ($\|d\|$), where $$\|d\| = \sqrt{\sum_{i=0}^{m} W_{ij}^2} \qquad \text{Eq. 3}$$

Then, as represented by process block 48, if the size of the Current Data Buffer is 20,000, the first document vector is deleted from the buffer, then the document vector d is appended to the end of the FIFO Current Data Buffer. Otherwise, the document vector d is appended to the end of the FIFO Current Data Buffer.

Then the New Document Counter is increased by 1 as represented by process block 49 and the document vector is an output represented by output block 50.

The dimensionality of a document vector d created by the previous process is m. In this step, the dimensionality of d is reduced to the predefined k mentioned in connection with process block 33 in FIG. 3 with dimensions determined by the following equation. The reduced document vector is denoted as $\hat{d}$:

$$\hat{d} = d^T U_k \Sigma_k^{-1} \qquad \text{Eq. 4}$$

where d is the original document vector, $U_k$ and $\Sigma_k$ are the matrices resulted from the truncated SVD process in block 33 of FIG. 3, and $\hat{d}$ is the document vector with reduced dimensionality. $\hat{d}$ has k dimensions.

In a test embodiment, k was set to 200 to create the two matrices used in the initial data model, namely, $U_k$ and $\Sigma_k$. Then, a vector according to Eq. 4 above can be created for each new document entering the system, as represented in block 17 in FIG. 1, without recomputing the data model 15. The document vector computation is conveniently accomplished by Computer System B in FIG. 1.

The result of the similarity analysis can be output to a human observer in many ways. The results can be displayed by clustering results and displaying them on a visual display in a tree graph form as disclosed in Potok et al., U.S. Pat. No. 7,072,883 and Potok et al. US2003/0120639.

The data model used to create document vectors and to reduce their dimensionality is periodically evaluated and updated in the background on System A. This way, the client application that depends on the high throughput of the dimensionality reduction process (Computer System B) will not experience any delay. This process is invoked each time when the New Document Counter reaches 20,000. This is a five step process shown in FIG. 9.

As represented by process block 55, a pair wise document-to-document similarity SM1 is calculated by using the original document vectors d. The similarity between two documents is defined by Equation 4 below. Let SM1 denote this similarity matrix. It is a 20,000×20,000 matrix. Equation 4 below describes the algorithm that generates SM1.

$$CosineSimilarity(d_1, d_2) = \frac{d_1 \cdot d_2}{\|d_1\| \times \|d_2\|} \quad \text{Eq. 4)}$$

Next as represented by process block 56, a pair wise document-to-document similarity SM2 is calculated by using the document vectors $\hat{d}$ with reduced dimensionality, using the same algorithm as shown in Equation 4.

As represented by block 57, a mean squared error (MSE) threshold is calculated. A threshold of 0.3 was used in a demonstration implementation. The mean square of SM1 and SM2, α, is calculated using the equations given in Equations 5 and 6 below.

$$\text{Error} = \sum_{i=0}^{i=19,999} \sum_{j=i}^{j=19,999} (SM1[i][j] - SM2[i][j])^2 \quad \text{Eq. 5)}$$

$$\alpha = \sqrt{\text{Error}} \quad \text{Eq. 6)}$$

Figure 9:
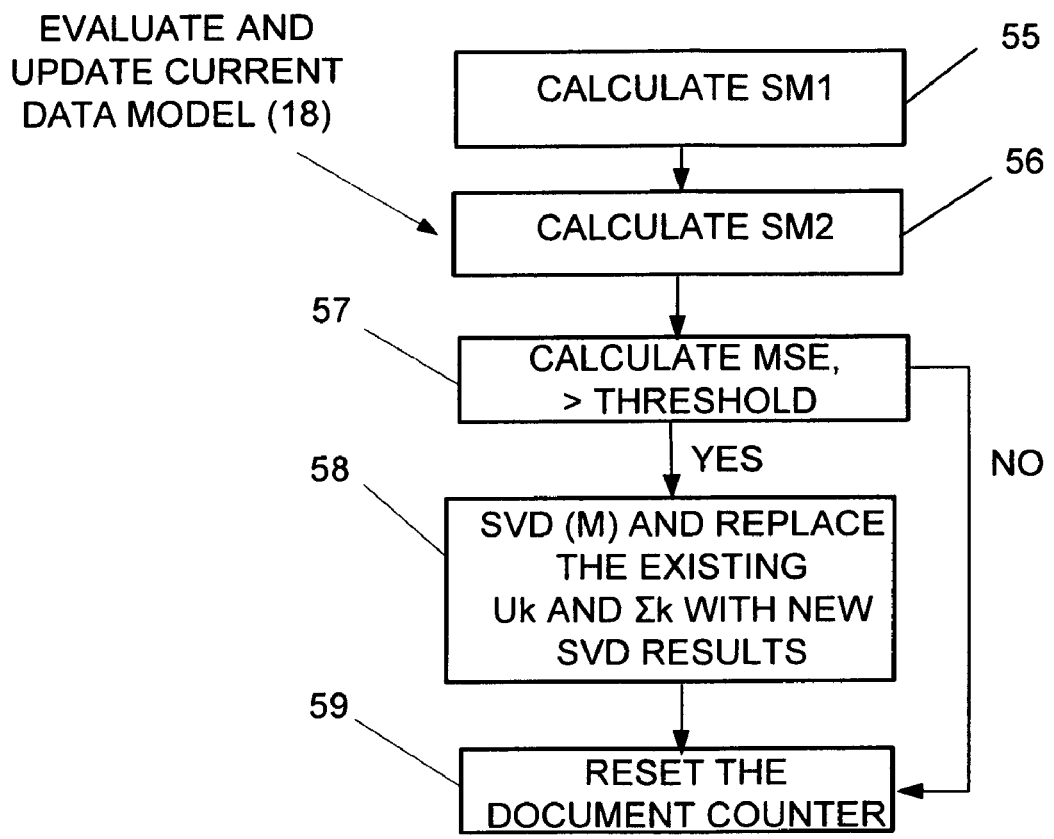
FIG. 9 is detail block diagram of another one of the blocks illustrated in FIG. 3.

If α exceeds the threshold, as represented by the "YES" result in FIG. 9, the process proceeds to block 58, otherwise, as represented by the "NO" result in FIG. 9, the process skips block 58 and proceeds to block 59.

As represented by process block 58, a term-document matrix M is calculated using the 20,000 original document vectors d from the Current Data Buffer. M is an m×20,000 matrix, where m is the number of entries in the Corpus Dictionary. The SVD(M) is calculated using the process in FIG. 3. The new $U_k$ and $\Sigma_k$, are used to replace the old ones in the current data model.

Where the error is not as great as 0.3, process block 58 is skipped and the document counter is reset to zero as represented by process block 59.

It will be apparent to those of ordinary skill in the art that modifications might be made to these details to arrive at other embodiments without departing from the spirit and scope of the invention.

Appendix A contains the list of punctuation marks and symbols that are removed from documents in by the preprocessor in FIG. 2. Appendix B contains a list of common words removed from documents by the preprocessor in FIG. 2.

It will be apparent to those of ordinary skill in the art that other modifications might be made to these details to arrive at other embodiments. It should be understood that the description of a preferred embodiment herein was by way of example, and not by way of limitation, and for the scope of the invention herein reference should be made to the claims that follow.

APPENDIX A

LIST OF PUNCTUATION MARKS AND SYMBOLS REMOVED FROM DOCUMENTS

| . | ? | ! | : | ; | - | — | ( | ) |
|---|---|---|---|---|---|---|---|---|
| [ | ] | ... | , | " | " | / | , | ~ |
| @ | # | $ | % | ^ | & | * | + | - |
| = | { | } | \| | # | © | << | >> | × |

APPENDIX B

LIST OF COMMON WORDS REMOVED FROM DOCUMENT a
about
above
across
after
afterwards
again
against
all
almost
alone
along
already
also
although
always
am
among
amongst
amoungst
amount
an
and
another
any
anyhow
anyone
anything
anyway
anywhere
are
around
as
at
back
be
became
because
become
becomes
becoming
been
before
beforehand
behind
being
below
beside
besides
between
beyond
bill
both
bottom
but
by
call
can
cannot APPENDIX B-continued

LIST OF COMMON WORDS REMOVED FROM DOCUMENT cant
co
computer
con
could
couldnt
cry
de
describe
detail
do
done
down
due
during
each
eg
eight
either
eleven
else
elsewhere
empty
enough
etc
even
ever
every
everyone
everything
everywhere
except
few
fifteen
fify
fill
find
fire
first
five
for
former
formerly
forty
found
four
from
front
full
further
get
give
go
had
has
hasnt
have
he
hence
her
here
hereafter
hereby
herein
hereupon
hers
herself
him
himself
his
how
however
hundred
i
ie
if
in
inc APPENDIX B-continued

LIST OF COMMON WORDS REMOVED FROM DOCUMENT indeed
interest
into
is
it
its
itself
keep
last
latter
latterly
least
less
ltd
made
many
may
me
meanwhile
might
mill
mine
more
moreover
most
mostly
move
much
must
my
myself
name
namely
neither
never
nevertheless
next
nine
no
nobody
none
noone
nor
not
nothing
now
nowhere
of
off
often
on
once
one
only
onto
or
other
others
otherwise
our
ours
ourselves
out
over
own
part
per
perhaps
please
put
rather
re
same
see
seem
seemed
seeming
seems

APPENDIX B-continued
LIST OF COMMON WORDS REMOVED FROM DOCUMENT serious
several
she
should
show
side
since
sincere
six
sixty
so
some
somehow
someone
something
sometime
sometimes
somewhere
still
such
system
take
ten
than
that
the
their
them
themselves
then
thence
there
thereafter
thereby
therefore
therein
thereupon
these
they
thick
thin
third
this
those
though
three
through
throughout
thru
thus
to
together
too
top
toward
towards
twelve
twenty
two
un
under
until
up
upon
us
very
via
was
we
well
were
what
whatever
when
whence
whenever
where
whereafter

APPENDIX B-continued
LIST OF COMMON WORDS REMOVED FROM DOCUMENT whereas
whereby
wherein
whereupon
wherever
whether
which
while
whither
who
whoever
whole
whom
whose
why
will
with
within
without
would
yet
you
your
yours
yourself
yourselves

The invention claimed is:

1. A method for reducing dimensions of a document vector used to determine the similarity of a first document to a plurality of other documents in a computer, the method comprising:

receiving a document that is input to the computer for determining the similarity of the document to the plurality of other documents;

preprocessing the document to generate a document vector;

reducing a number of dimensions in the document vector, wherein the dimensionality of a document vector d created by the previous process is m and is reduced to a predefined k with dimensions determined by the following equation:

$$\hat{d}: \hat{d} = d^T U_k \sum_k{}^{-1},$$

wherein d is an original document vector, $U_k$ and $\Sigma_k$ are the matrices resulted from a truncated singular value decomposition (SVD) process and $\hat{d}$ is the document vector with reduced dimensionality $\hat{d}$ having k dimensions;

comparing the document vector with reduced dimensions to at least one document vector for the plurality of documents to determine a similarity of the document to the plurality of other documents; and displaying a measure of similarity of the document to the other documents to a human observer.

2. The method of claim 1, further comprising:
preprocessing a plurality of initial documents;
computing a data model representing the plurality of initial documents;
wherein the document vector for the document is compared to at least one document vector for the data model to determine the similarity of the document to the documents forming the data model; and recomputing the data model upon receiving a predetermined number of new documents.

3. The method of claim 2, wherein the document vector for the document is compared to a document vector for the data model without updating the data model until a second plurality of documents equaling the predetermined number have been received and processed by the computer.

4. The method of claim 3, wherein a calculation of the document vector with reduced dimensions is performed by a first computer; and
wherein the updating of the data model is performed by a second computer in communication with the first computer.

5. The method of claim 3, further comprising updating the data model when a document count reaches the predetermined number of 20,000 documents.

6. The method of claim 2, wherein the data model is computed from a large corpus of at least 200,000 documents, wherein a global frequency of words in the corpus of documents is expressed in a first table; wherein a term frequency of terms in the corpus of documents is expressed in a second table; and wherein a document matrix of initial dimension, m, is generated; and wherein a truncated singular value decomposition (SVD) is computed according to the expression: $SVD_k(M) = U_k \Sigma_k V_k^T$, where $U_k$ is a m×k matrix of initial dimension m; and $\Sigma_k$ is a k×k matrix of reduced dimension k used in the data model.

7. The method of claim 1, wherein a reduced number of dimensions, k, is preset to a specific number.

8. The method of claim 1, wherein the preprocessing of the document received by the computer further comprises:
removing punctuation marks and symbols;
removing stop words; and
parsing the document into a list of stemmed words.

9. A computer system for reducing dimensions of a document vector used to determine the similarity of a first document to a plurality of other documents in the computer system, the system comprising:
means for receiving a document that is input to the computer for determining the similarity of the document to the plurality of other documents;
means for preprocessing the document to generate a document vector; and
means for reducing a number of dimensions in the document vector, wherein the dimensionality of a document vector d created by the previous process is m and is reduced to a predefined k with dimensions determined by the following equation:

$$\hat{d}: \hat{d} = d^T U_k \sum_k^{-1},$$

wherein d is the original document vector, $U_k$ and $\Sigma_k$ are the matrices resulted from the truncated singular value decomposition (SVD) process and $\hat{d}$ is the document vector with reduced dimensionality $\hat{d}$ having k dimensions;
means for comparing the document vector of reduced dimensions to at least one document vector for the plurality of documents to determine a similarity of the document to the plurality of other documents; and
means for displaying a measure of similarity of the document to the other documents to a human observer.

10. The system of claim 9, further comprising:
means for preprocessing a plurality of initial documents; and
means for computing a data model representing the plurality of initial documents; and
wherein the document vector for the document is compared to at least document vector for the data model to determine the similarity of the document to the documents forming the data model.

11. The system of claim 10, wherein the document vector for the document is compared to a document vector for the data model without updating the data model until a second plurality of documents have been received and processed by the computer.

12. The system of claim 11, wherein means for comparing the document vector to at least one document vector for the plurality of documents is incorporated in a first computer; and
wherein an updating of the data model is performed in a second computer in communication with the first computer.

13. The system of claim 11, wherein the updating of the data model is performed when a document count reaches 20,000 documents.

14. The system of claim 10, wherein the data model is computed from a large corpus of at least 200,000 documents, wherein a global frequency of words in the corpus of documents is expressed in a first table; wherein a term frequency of terms in the corpus of documents is expressed in a second table; and wherein a document matrix of initial dimension, m, is generated; and wherein a truncated singular value decomposition (SVD) is computed according to the expression: $SVD_k(M) = U_k \Sigma_k V_k^T$, where $U_k$ is a m×k matrix of initial dimension m; and $\Sigma_k$ is a k×k matrix of reduced dimension k used in the data model.

15. The system of claim 9, wherein a reduced number of dimensions, k, is preset to a specific number.

16. The system of claim 9, wherein the preprocessing of the document received by the computer further comprises:
removing punctuation marks and symbols;
removing stop words; and
parsing the document into a list of stemmed words.

* * * * *